(12) United States Patent
Walliser

(10) Patent No.: US 9,953,101 B1
(45) Date of Patent: Apr. 24, 2018

(54) CUSTOMIZED HOME SCREENS FOR ELECTRONIC DEVICES

(75) Inventor: Marc Rene Walliser, San Francisco, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 180 days.

(21) Appl. No.: 13/170,161

(22) Filed: Jun. 27, 2011

(51) Int. Cl.
*G06F 3/00* (2006.01)
*G06F 17/30* (2006.01)
*G06F 21/32* (2013.01)

(52) U.S. Cl.
CPC ........ *G06F 17/30905* (2013.01); *G06F 21/32* (2013.01); *G06F 2203/011* (2013.01)

(58) Field of Classification Search
CPC .... G06F 3/0481; G06F 3/0488; G06F 3/0482; H04M 1/72563; H04M 1/72566; H04M 1/72569; H04M 1/72572
USPC ......................................................... 715/765
See application file for complete search history.

(56) References Cited

U.S. PATENT DOCUMENTS

| | | | | |
|---|---|---|---|---|
| 7,523,191 B1* | 4/2009 | Thomas | .............. | G06F 11/3438 709/202 |
| 8,478,306 B2* | 7/2013 | Zheng | ......................... | 455/456.6 |
| 9,055,385 B1* | 6/2015 | Singh | .................... | H04W 4/003 |
| 2007/0006163 A1* | 1/2007 | Aoki | ........................ | G06F 21/31 717/127 |
| 2007/0073682 A1* | 3/2007 | Adar | ................. | G06F 17/30861 |
| 2008/0114847 A1* | 5/2008 | Ma | ........................ | G06Q 50/184 709/206 |
| 2010/0082444 A1* | 4/2010 | Lin | ........................ | G06Q 20/042 705/17 |
| 2011/0072361 A1* | 3/2011 | Sakai | .................. | H04M 1/72522 715/745 |
| 2011/0078267 A1* | 3/2011 | Lee | ...................... | H04L 12/5855 709/206 |
| 2011/0185283 A1* | 7/2011 | Jun | .................... | H04M 1/72572 715/745 |
| 2012/0115501 A1* | 5/2012 | Zheng | ............... | H04M 1/72569 455/456.1 |
| 2012/0303476 A1* | 11/2012 | Krzyzanowski | .......... | G06F 8/60 705/26.5 |
| 2013/0196615 A1* | 8/2013 | Zalmanovitch | ....... | H04W 24/02 455/405 |
| 2013/0337789 A1* | 12/2013 | Johnson | .................. | H04W 4/02 455/414.1 |

* cited by examiner

*Primary Examiner* — Di Xiao
(74) *Attorney, Agent, or Firm* — Polsinelli LLP

(57) ABSTRACT

Some embodiments provide customizable home screens on an electronic device that enable a user of the electronic device to switch between the different home screens. In some embodiments, each home screen corresponds to a setting or profile (e.g., home profile, work profile, sleep profile, workout profile, commute/road trip setting, sports arena setting, etc.) that may be activated upon triggering the corresponding home screen (e.g., by user input, upon a cue, upon a set time). Upon triggering a particular home screen (e.g., road trip setting), the device of some embodiments displays a set of application icons (e.g., weather application, road condition/traffic application, navigator, gas station application) and activates a set of functionalities (vibrate plus ring mode, Bluetooth®) associated with the home screen. This allows the user to have ready access to useful applications and a bundle of functionalities activated on the device for the particular setting or profile.

20 Claims, 6 Drawing Sheets

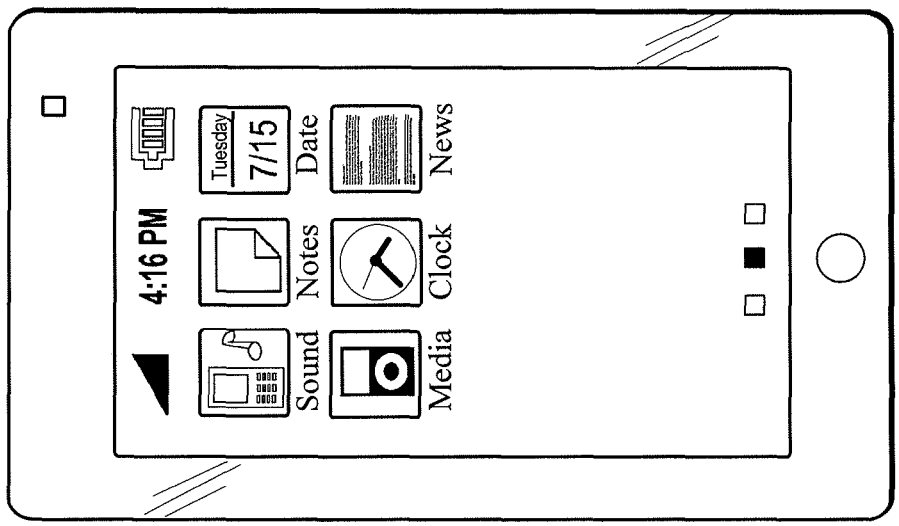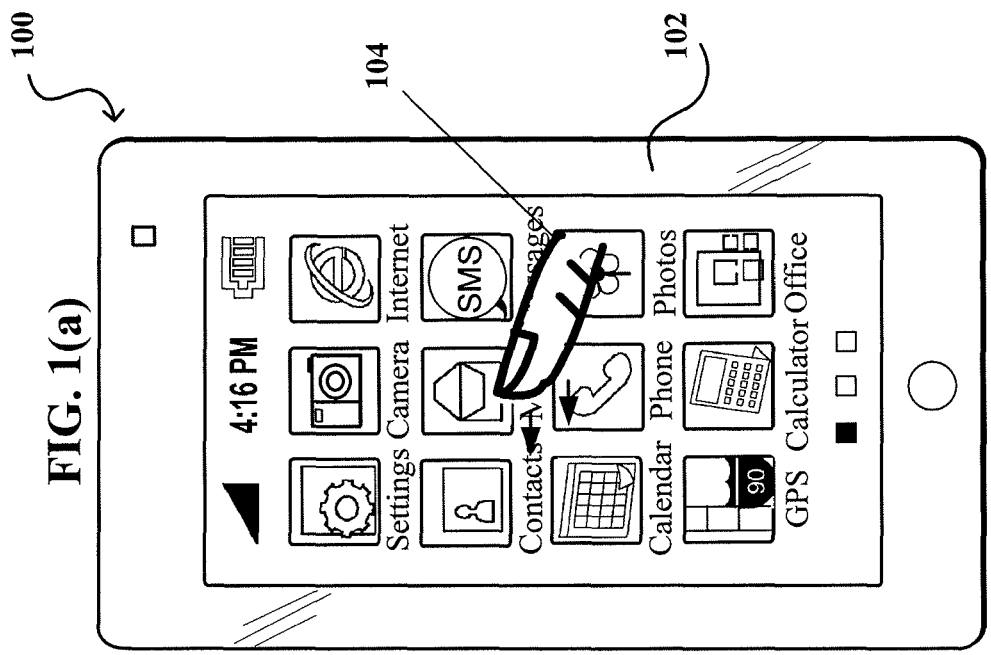

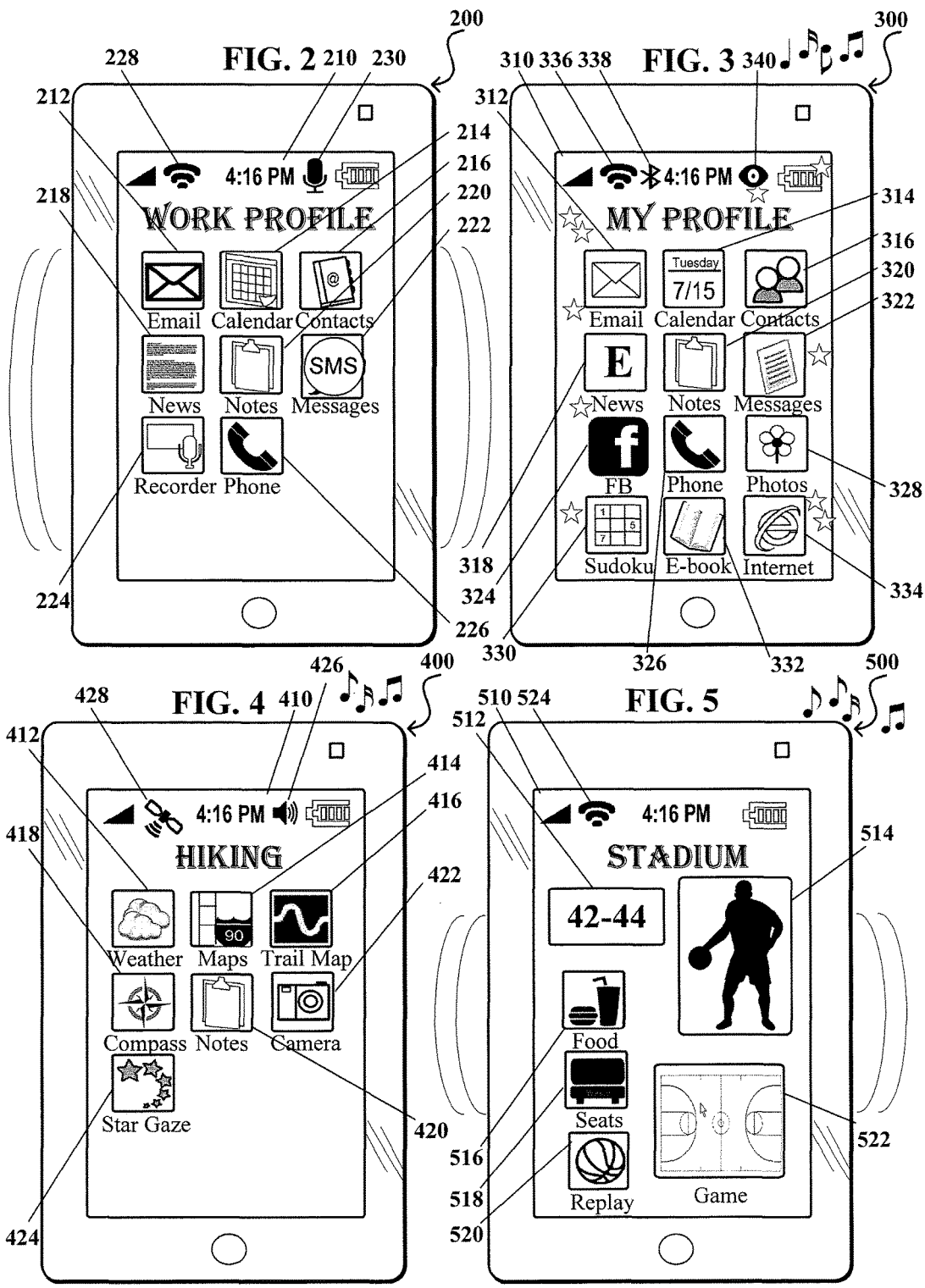

CUSTOMIZED HOME SCREENS FOR ELECTRONIC DEVICES

BACKGROUND

People are increasingly utilizing electronic devices for a variety of different tasks, such as checking email, managing calendars, listening to music, reading the news, and surfing the Internet. Oftentimes, a user may utilize specific applications and a set of the available functionalities on an electronic device when the user is in a particular setting. With the increasing number of applications and functionalities provided by an electronic device, however, a user may find it difficult to keep track of the location of application icons displayed on the user interface of the device, or at least might not enjoy having to continually scroll through multiple screens to reach certain applications, particularly on mobile devices. The user may be able to move the related application icons closer to each other on the user interface and launch the applications and/or functionalities when needed, but having to individually find and launch the applications and functionalities may be at least inconvenient for the user. Further, the functionality used for a certain setting might involve one or more manual adjustments each time the user enters or leaves that setting, which can provide a further source of inconvenience.

BRIEF DESCRIPTION OF THE DRAWINGS

Various embodiments in accordance with the present disclosure will be described with reference to the drawings, in which:

FIGS. 1(a) and 1(b) illustrate an example situation of how a user of an electronic device traditionally navigates through content (e.g., applications and functionalities) on the device in accordance with various embodiments;

FIG. 2 illustrates an example in which an electronic device activates a number of functionalities and displays a number of applications when a particular home screen (i.e., work profile) of the electronic device is triggered in accordance with various embodiments;

FIG. 3 illustrates another example in which an electronic device activates a number of functionalities and displays a number of applications when a particular home screen (i.e., home profile) of the electronic device is triggered in accordance with various embodiments;

FIG. 4 illustrates another example in which an electronic device activates a number of functionalities and displays a number of applications when a particular home screen (i e, hiking profile) of the electronic device is triggered in accordance with various embodiments;

FIG. 5 illustrates another example in which an electronic device activates a number of functionalities and displays a number of applications when a particular home screen (i.e., stadium profile) of the electronic device is triggered in accordance with various embodiments;

DETAILED DESCRIPTION

Figure 6:
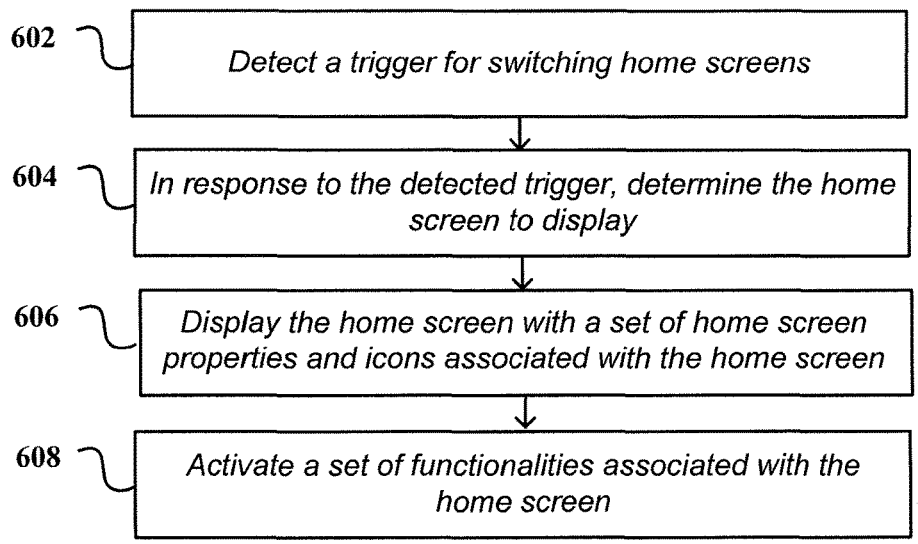
FIG. 6 illustrates an example process for displaying a set of icons and activating a bundle of functionalities associated with a home screen upon triggering a home screen on an electronic device in accordance with various embodiments.

Systems and methods in accordance with various embodiments of the present disclosure may overcome one or more of the aforementioned and other deficiencies experienced in conventional approaches to managing content and/or functionality on an electronic device. In particular, various approaches provide for the automatic launching, activation, or setting of various functionalities on an electronic device, as well as an update of a selection of options, applications, or other such content displayed to a user, when a user of an electronic device is in a particular setting or places the device in a certain state. In particular, various embodiments provide customizable home screens on an electronic device. Each user of a device can have the ability to generate and/or configure customizable home screens, or other such interface states, to include a number of applications, properties, functionalities, and other such aspects that would be available and presented to, or activated for, the user when the customizable home screen is triggered. The device of some embodiments then launches and/or displays the applications and activates the functionalities that correspond to the triggered home screen.

A user of an electronic device will often launch a specific selection of applications (e.g., email application, calendar application, Web browser application, media player application) and activate or deactivate certain functionalities (e.g., vibrate, camera function, accelerometer, Wi-Fi, Bluetooth®, screen brightness) when the user is in a particular setting (e.g., work, home, school, workout, movie, commute, etc.). Further, the selection of applications and functionalities will generally be different for at least some of these settings. Some of these applications and functionalities can be represented by icons that are displayed across a user interface of the device.

In some embodiments, a user may activate a functionality by finding a setting option within an application or control panel, for example, and then manually activating the functionality, which can include turning a functional aspect of the device on or off, setting a particular state of a functional aspect, etc. For example, in order to turn on the Bluetooth® or Wi-Fi functionalities of the device, the user may go through the preference settings application (e.g., represented by a settings icon) to find the appropriate user-selectable user interface item to manually activate these functionalities.

While a user is in a particular setting (e.g., at work, on a hike, etc.), the user may often launch several different applications and activate functionalities variably throughout the duration that the user is in the particular setting. The user would typically launch the applications and/or activate certain functionalities as needed throughout the duration. For example, while the user is at a workout session, the user may launch a weather application to determine whether the user should workout indoors or outdoors. The user may then launch a media player application (e.g., iTunes®, Windows® media player) to play her warm up song while increasing the ring tone volume to above the warm up song's volume. Subsequently, the user may play a streaming workout video through a Web browser that the user may follow during the workout. Throughout the workout session, the user may activate additional features or launch additional applications, such as a step counter or a pedometer application that counts the number of steps that the user makes during the workout session.

The user of the device may configure an electronic device to have multiple home screens. In some embodiments, each home screen corresponds to a different virtual environment on the device where each of the virtual environments is associated with a number of applications and functionalities. While the term "home screen" is used herein, it should be understood that any appropriate interface or collection of content that can be presented in accordance with the present description can be utilized as well within the scope of the various embodiments. The device of some embodiments activates associated functionalities on the device and displays the associated application icons on a home screen (or additional secondary screens) when the home screen corresponding to the virtual environment is triggered. For example, the "work" virtual environment may be associated with work email application and work calendar application. When the work home screen is triggered (e.g., selected by user input such as by sliding the user's finger across a touch sensitive screen), the device activates functionalities associated with the "work" environment and displays icons (representing the work email application and the work calendar application) associated with that environment. In various embodiments, there might be more icons associated with an environment than can be displayed simultaneously on a display element of an electronic device, such that other navigational approaches can be used as well, such as scrolling down the "work home screen," using additional windows, menus, or secondary screens, etc.

Some embodiments enable the user to configure the home screens such that each home screen corresponds to a particular setting or profile and that different home screens may share some of the same applications and functionalities. In some instances, the user may want to have one home screen configured for work (i.e., a work profile) while having another home screen configured for a meeting setting (i.e., a meeting profile). In some embodiments, the "meeting" setting might be a sub-screen of the work profile, containing a subset of the applications for the meeting screen, at least some of the same functional settings, etc. The user may configure the two home screens such that when the device is operating in either home screens, the user receives work-related emails and also notifications of the receipt (e.g., through push technology), while many other features and/or functionalities may not be shared (e.g., the work home screen may set a vibrate mode for receiving phone calls and texts while the meetings home screen may set a silent mode for receiving phone calls and texts).

The user may configure each environment to include a number of applications that may be accessible by the user when the corresponding home screen is activated (e.g., by the user selecting a particular home screen). As described above, the user may associate each of the home screens to a setting or a profile such as a work profile, home profile, dinner profile, sports games profile, food profile, workout profile, etc.

According to the particular setting or profile, the user may associate certain functionalities and applications with the setting or profile. The device of some embodiments may then display the application icons on the corresponding home screen, thereby making those applications easily accessible by the user when the user is on that particular home screen. For example, the user may include a sports news update application, a Fantasy sports score keeping function, a direct link to streaming video playing an ongoing game, links to past games, and a personal profile displayed in the background in a sports profile. Different users may include different applications and functionalities for a similar type of profile (e.g., sports profile).

Some embodiments activate a series of functionalities (e.g., turning on/off certain functionalities, such as designating "vibrate" to be on or turning "sound" to mute) and launch or display a number of applications when a particular home screen is selected. In some embodiments, a particular home screen is selected by a user of the device (e.g., by swiping the display to the left or right using a finger, by tapping a symbol on the display that directs the user to a particular home screen, by toggling a component coupled to the device, etc.), thereby causing the device to display a particular home screen. The device of some embodiments then displays a set of application icons associated to the particular home screen and activates a set of functionalities associated with the particular home screen.

Some embodiments activate a particular home screen automatically when the device detects a change in the user's setting. In some embodiments, a particular home screen is automatically activated by detecting the user's current location. In one example, the device may switch to international mode when the device detects that the user is in a foreign geographical area (e.g., by using the GPS of the device). In another example, the device may switch to a sports arena setting when the device determines that the user is at a baseball game (e.g., by looking at the user's calendar, by capturing images or audio from the user's surroundings, by tracking the user's location, by receiving a signal from the entrance of the stadium, etc.). Some embodiments automatically activate a home screen by monitoring the time (e.g., time of day, time of month, after a certain period of time, etc.). For example, the device may automatically switch to a work profile at 8 am and then to a home profile at 5 pm.

Further, the device of some embodiments switches to a particular home screen automatically upon a cue or when a certain predefined condition is met. For example, the device may switch to business home screen when the user receives a call from a business client. The screen may then display application icons for a business contacts application, thereby enabling the user to conveniently view information related to the business client.

In some embodiments, an electronic device may provide the user with various home screens that each have a bundle of functionalities and applications associated with the home screens. This allows the user to quickly and easily activate a bundle of functionalities and applications when the user enters a setting or activates a profile. In other words, the user may have convenient access to those applications and functionalities most applicable to the user's current situation and/or status instantly (e.g., at a single swipe of a finger, upon receiving a cue), as opposed to having the user search through all the applications and functionalities on the device each time the user is in a different setting and then having the user individually activate them.

Various other applications, processes and uses are presented below with respect to the various embodiments.

FIGS. 1(a)-1(b) illustrate an example situation 100 of how a user of an electronic device can navigate through content (e.g., applications and functionalities) on the device using a conventional approach. As shown in FIG. 1(a), the device 102 displays a screen full of icons that represent different applications on the device. The typical icons on a user's device are displayed here, including a settings icon, a camera icon, an Internet icon, a contacts icon, a mail icon, a messages icon, a calendar icon, a phone icon, a photos icon, a navigator icon, a calculator icon, and a Microsoft® Office icon. The user may select the different icons to launch an application (e.g., select the Internet icon to access the World Wide Web) or navigate through the applications to activate certain functionalities of the device (e.g., activate vibrate mode).

As shown in FIG. 1(a), the user 104 is swiping to the left (e.g., using a finger 104) to view additional icons on the display since not all of the user's icon fits on the display screen. FIG. 1(b) displays the user's additional icons in a second window upon the user's selection to view the additional icons. In some embodiments, the user may have hundreds of icons that span over several windows. In order to launch an application or activate a functionality, the user scrolls through the windows to find the desired application or functionality to launch.

In certain situations, the user of the device may need to launch various applications and functionalities that are embedded in the applications. In the instance that the user is attending a business meeting, the user may first need to retrieve his calendar to refresh his memory on the subject of the meeting and also access the settings application to turn his phone on silent before he may enter the conference room. During the meeting, the user may need to access his email application to retrieve documents sent from a client or pull up documents that the user intends to share with the client. Moreover, the user may edit documents during the meeting using a Microsoft® Word application or a Mac® Notepad application.

As mentioned above, the user may need to launch several applications and functionalities for a particular setting or profile. The process of navigating through the different displays on the device to find the desired application to launch and also navigating through the applications to find the appropriate functionality may be inconvenient for the user as the user needs to navigate through the windows and icons and then individually launch the different applications and functionalities. This task can be especially time consuming when there is a large number of icons on the device and when the desired functionality is deeply embedded within an application.

Systems and methods in accordance with various embodiments provide customizable home screens for different user settings or profiles. The device of some embodiments may provide home screens that are each associated with a "bundle" of features such that the features are activated upon a triggering of the home screen (e.g., upon user selection of the home screen or upon an external cue). Having these home screens customized to a particular setting or profile enables the user to easily access applications related to a particular topic or setting and activate the desired functionalities when the corresponding home screen has been triggered.

Further, some embodiments enable a user to create and configure virtual environments in the operating system of an electronic device in accordance with different settings and/or profiles. As described above, in some embodiments, a virtual environment may be associated with one or more applications and/or functionalities that may be useful to a user in a particular setting. The device of some embodiments then activates the associated functionalities when the user is in the particular setting. Some embodiments display the associated application icons on a home screen associated with the virtual environment. In some embodiments, the application icons are displayed over a home screen and one or more other screens in addition to the home screen in order to accommodate all the application icons. For example, a home environment may be associated with thirty applications such that when the home profile is triggered, the device displays the thirty application icons over the home screen and other screens that are part of the home environment.

The device of some embodiments enables the user to associate a "bundle" of functionalities and applications with each environment so that the associated elements (i.e., the "bundle" of functionalities and applications) are activated and/or displayed when the corresponding home screen is active. This enables the user to customize the device such that the desired "bundle" of features would be automatically enabled upon a simple home screen switch (e.g., by swiping the finger across the screen to reach the different screens).

Some embodiments activate a number of functionalities and display a number of applications when a particular home screen is triggered. FIG. 2 illustrates one such example of a triggered home screen on a device 200. As shown in this example, the work profile has been triggered (e.g., by user selection, by the device detecting the user to be within work premises, by reaching a normal work hour). In some embodiments, the work profile is activated upon a user's selection of the work home screen (e.g., via a swiping of a finger, by selecting an option box, by selecting a symbol corresponding to the particular environment, etc.).

Some embodiments trigger the work profile automatically upon detecting a change in the user's surroundings, upon a set time, etc. In one instance, the device of some embodiments triggers the work profile when the device detects that the user has reached the user's company (e.g., through a GPS or by connection with a company wireless network). In another instance, the device of some embodiments activates the work profile at a certain hour, such as at eight o'clock when the user normally reaches his office.

In some embodiments, the work profile includes various work-related applications that enable a user to perform a variety of tasks including receiving/sending email messages, scheduling meetings and events, adding and retrieving contacts, reading company news and updates, taking quick notes, pinging coworkers regarding projects, recording meetings, calling clients, etc. As shown in FIG. 2, the work profile screen 210 displays applications for work email 212, work calendar 214, company directory 216, news 218, notes 220, instant messaging 222, recorder 224, and phone 226. Some embodiments may also associate the work profile with a number of features and functionalities including features such as quick dimming of the background light on the device (not shown), Wi-Fi 228, vibrate mode for calls and texts (as indicated by the arcs around the device 200), vibrating only once when the device receives a notification (not shown), voice record mode 230, etc. In some embodiments, the associated functionalities are automatically activated upon triggering the profile. Different embodiments may include different applications and features. Further, depending on the user's occupation, the user may configure the work profile to include additional features such as a GPS for couriers, a nature magazine application for doctors, and a direct link to the company's Intranet for corporate employees, etc.

Some embodiments enable users of the device to configure the profile such that the user may add additional features, functionalities, and applications that the user may use at work. This allows the user to activate functionalities or launch useful applications that are directly accessible through the work home screen. For example, the user may want to configure his device so that during work hours, his device checks for emails more frequently or that his device activates push technology. The user may also configure his device such that the device activates Wi-Fi.

While the bundle of features associated with a particular home screen may be configured by a user, in some embodiments the work profile may be configured by a third party. The third party may target specific industries, design and sell pre-customized home screens to corporations that require employees to use these home screens during work hours. In some embodiments, the work profile may be automatically activated by a cue at the workplace. Further, the device may be configured such that the meeting profile is activated when the user enters a conference room within the company.

FIG. 3 illustrates an example of a home profile that has been triggered (e.g., by a user swiping his finger in a particular direction on the screen of the device) on a device 300. Similar to that described above, some embodiments may trigger the home profile when the device detects a change in setting (i.e., time or location). In one instance, the device may trigger the home profile upon the user leaving his work premises or when the user reaches home (e.g., determined using the device's GPS). In another instance, the device may trigger the home profile at a set hour, such as at 5 pm when the user typically leaves the workplace.

As described above, some embodiments activate a number of functionalities and display a number of applications when an environment is triggered. In some embodiments, the home profile includes several applications and functionalities directed to those that the user may find useful when the user is at home or during the user's personal time. For instance, the user may have personalized features such as a wallpaper, a ring tone, etc. on this home screen. Further, the home profile home screen may display several applications that the user would typically launch on his own free time, such as an email application (e.g., a Gmail® application) for checking and sending personal emails, a calendar application (e.g., Windows® Calendar, Microsoft® Entourage, etc.) for keeping track of a personal schedule, social networking applications (e.g., Facebook®, Foursquare®, Twitter®), gaming applications (e.g., Angry Birds®), instant messaging applications (e.g., AIM®, iChat®), video streaming applications (e.g., YouTube®), etc.

As shown in FIG. 3, the home profile screen 310 displays applications for personal email 312, personal calendar 314, personal contacts 316, entertainment news 318, notes 320, instant messaging 322, social networking 324, phone 326, photo album 328, games 330, e-books 332, and an Internet browser 334. Some embodiments also associate the home profile with features and functionalities such as Wi-Fi 336, Bluetooth® 338, image capture mode 340 (which activates one or more cameras coupled to the device and enables the device to receive and track gestures, motions, and/or gaze inputs), personal wallpaper (as indicated by the stars), personal ring tone with a higher volume (indicated by the musical notes), direct links to a certain websites (not shown) (e.g., personal blogs like Xanga®, political blogs), brighter backlight (not shown), etc. Moreover, in some embodiments, the user may configure the home profile screen such that the device does not ring when a contact from the work contacts list is calling. The device may determine whether the caller is from the user's personal contact book and ring only if the caller is within the personal contact book. Some embodiments may categorize the caller (e.g., by corporate contact, by client, by family, etc.) and output different ring tones accordingly.

In some embodiments, the user may want to switch to a home profile when the user is not in a work setting, etc. Some embodiments set the personal or home profile as the user's default display. The device of some embodiments may require the user to input a valid password to be able to access the contents of the personal or home profile. In some embodiments, this password may be an operating system level password that may lock different home screens as specified (e.g., by a user, by an administrator).

FIG. 4 illustrates an example of a hiking profile that has been triggered on a device 400. The hiking profile may be triggered when the user plans to go on a hike and the user selects the hiking home screen. As mentioned above, the hiking profile may be triggered upon other cues, such as when the device detects that the user is in a specific location (e.g., using the device's GPS) or when the device determines that the user is going on a hike (e.g., using the user's calendar).

The hiking profile may include various hiking-related applications and activate functionalities of the device that the user may want activated during a hike. For instance, as shown in FIG. 4, the hiking profile 410 includes a weather application 412 (e.g., that enables the user to check the weather conditions before and during a hike), a web mapping service application 414 (e.g., Google® Maps) that directs the user the best route in getting to the hike, a trail map 416 that provides elevation change and other trail-related information, a compass application 418 that guides the user throughout the hike, a note taking application 420 that allows the user to take notes of events along the hike, a camera application 422 that enables the user to quickly access and snap shots along the hike, and a star gazing application 424 that allows the user to identify constellations.

Further, the hiking profile activates a number of functionalities upon triggering the hiking profile, such as a low-humming ring tone (as indicated by the musical notes), turning off of Bluetooth® (not shown), activating the speaker phone functionality 426 (e.g., to warn the user if she has gone off course), activating the GPS functionality 428 for tracking the user's location and for directing the user to a certain location, etc. The profile can also select certain functional states, such as a setting where a cellular connection is checked less frequently in order to conserve power when the user is likely to be in a remote area with little to no cellular signal availability.

Upon triggering the hiking profile, the device displays the applications on the display and activates a bundle of functionalities that are associated with the hiking profile. Some of the applications and functionalities may be the same as applications and functionalities that may be activated in other profiles and settings. As described above, while some embodiments enable a user to configure the hiking profile to include the various features and functionalities, some embodiments allow a third party to configure a hiking profile that may be readily purchased by users who are interested in the hiking profile.

FIG. 5 illustrates an example of a stadium setting that has been triggered on a device 500. The stadium setting may be triggered when the device determines that the user has entered a sports stadium, such as through detecting the user's surroundings, through looking at the user's calendar, through observing the user's activity pattern, through locating the user's location, etc. The device may also use a combination of factors to determine the current setting of the user. In this example, the stadium environment includes features such as vibrate, a ring tone that detects the surrounding audio level so as to ensure that the ring tone level is audible to the user, etc.

In some embodiments, the stadium setting includes various applications that the user may use while the user is watching a game in the stadium. As shown in the hiking profile 510 in FIG. 5, the user may have an application 512 that displays the scores in real-time. The device may include an application 514 that includes all the players' profiles and statistics. Some devices may also include an application 516 that enables the user to know the food offered at the stadium and order delivery to the user's seat, an application 518 that informs the user when better seats are available and provides the user with an option to upgrade his/her seat, and an application 520 that provides instant replay of highlights. Some embodiments may include an application 522 that allows real-time streaming of the game, which may be useful for the people sitting farther away from the basketball court.

The device of some embodiments may also activate a number of functionalities of the device and apply predetermined settings upon triggering a stadium setting. For instance, the device may increase the volume of the ring tone to a loud, vibrant ring, as indicated by the musical note. The device may also put the device on vibrate mode (as indicated by the arcs around the device) simultaneously to increase the chances that the user would be informed when the user receives a call or a message. Further, the device may activate Wi-Fi 524 switchover if the device detects a Wi-Fi signal within the stadium and disable Bluetooth® (not shown) as the user reaches the stadium to save battery.

Different embodiments may include various different settings and profiles, each setting and/or profile being associated with a different set of applications and functionalities (activated, deactivated, or preconfigured). While many of these settings and profiles may be associated with different applications and functionalities, many of the settings and profiles will share one or more of the same applications and functionalities. For instance, the sleep profile and the meeting profile may both have the device preconfigured to be on silent mode, while only the meeting profile out of the two profiles is associated with an email application that enables the user to receive work-related emails (whereas the sleep home screen does not even display an email application icon).

The types of settings and profiles are by no means limited by those described in this section. Various other profiles and settings (e.g., dinner profile, movie setting, classroom setting, hobby profile, low-battery profile, etc.) can be used as well as should be apparent. In some embodiments, many settings or profiles may be created and assembled by a third party. For example, a third party (e.g., Amazon®) may assemble home screens for profiles and/or settings such as ones for musicians, artists, commuters, restaurant goers, shoppers, etc.

In some embodiments, the device may also be connected to an external device (e.g., a Bluetooth® accessory, a docking station, an LCD screen) that can be activated when a home screen is triggered. In one instance, when a home profile is triggered, the user's smartphone may trigger an external device such as a Bluetooth® accessory to be activated. In another instance, the user's device may activate another screen display coupled to the user's device (e.g., a monitor, another screen of the user's smartphone) upon triggering a work profile. In some embodiments, the user of the device may then activate functionalities on the external device(s) coupled to the user's device along with the user's device upon switching home screens. Further, in some embodiments, the connection of the device with an external device may trigger the device to switch between different home screens. For example, a work profile may be triggered when the user places his smartphone in a docking station at work.

FIG. 6 illustrates an example process 600 for displaying a set of icons and activating a bundle of functionalities upon triggering a home screen on an electronic device in accordance with at least one embodiment. It should be understood that, for any process discussed herein, there can be additional, fewer, or alternative steps performed in similar or alternative orders, or in parallel, within the scope of the various embodiments unless otherwise stated. In some embodiments, a user of an electronic device configures a home screen by associating a set of icons and functionalities with the home screen. The device of some embodiments then displays the set of icons and activates the functionalities when the home screen is triggered.

In this example, a trigger for switching home screens or activating a particular home screen is detected (at 602). In some embodiments, the trigger for switching home screens may be a user input (e.g., a finger swipe to the left on a display screen of the device, a hand signal, a keyboard input, a cursor controller operation, a selection of a selectable user interface item, a toggling of the device), satisfying a predetermined condition (e.g., arriving at a location, reaching a particular hour), receiving a cue (e.g., an incoming phone call, an incoming message, a change in the background noise, a connection with an external device), etc. Different embodiments may trigger a home screen differently.

Next, the process 600 determines (at 604) the home screen to display in response to the detected trigger. Upon detecting a trigger, the device of some embodiments determines the corresponding home screen to display. In some embodiments, the device uses a lookup table to map a trigger to the corresponding home screen.

The process 600 then displays (at 606) the home screen with a set of home screen properties and icons associated with the home screen. In some embodiments, a home screen is associated with a set of home screen properties (e.g., color of background of the home screen) and icons (e.g., application icons). When a particular home screen is selected or triggered, the device of some embodiments displays the triggered home screen, along with its associated properties and icons. For instance, when a sleep profile is triggered, the device a displays a wallpaper that the user would like to see before he sleeps, displays an icon that enables the user to adjust the alarm, displays an icon for e-books conducive to sleep, deactivates other applications such as email, messages, and several other icons to save battery, etc.

The process 600 activates (at 608) a set of functionalities settings associated with the home screen. In some embodiments, the particular home screen is associated with a set of functionalities, such as vibrate mode, dim background light, turning off the background light within 3 seconds of activating the screen, turning off the sensors, etc. In the same example as the sleep home screen, some embodiments may put the device on silent mode but output an alert ringtone if a family member (or even in some instances, the user's boss) tries to contact the user, dim the background lights, turn off Wi-Fi and Bluetooth® functionalities, deactivate an external device such as a Bluetooth® accessory, turn on audio recording feature to monitor the user's snoring pattern, etc. In some embodiments, the set of functionalities are activated immediately upon the particular home screen being triggered. Some embodiments allow the user to configure the device such that certain functionalities are activated a period of time after the particular home screen is activated. Various other approaches can be used as well as discussed or suggested elsewhere herein.

Figure 7:
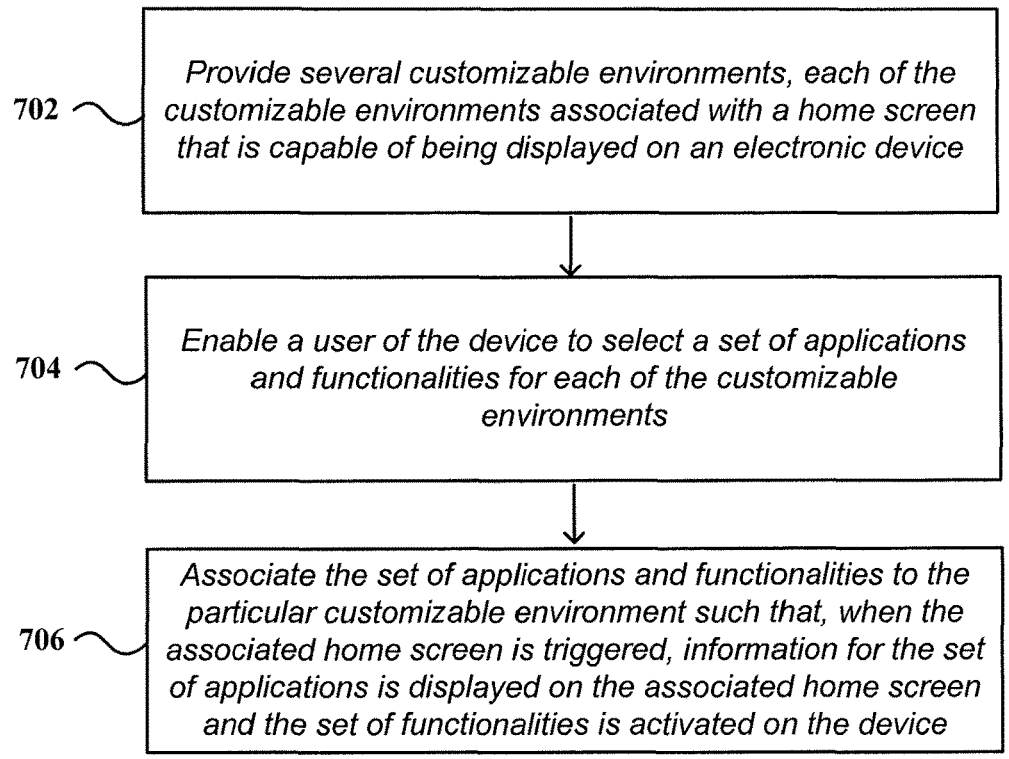
FIG. 7 illustrates an example process for enabling a user of an electronic device to configure multiple home screens on the device in accordance with various embodiments.

While some embodiments enable a user to have convenient access to associated applications and activate associated functionalities upon a triggering of a home screen, some embodiments enable a user of an electronic device to determine which applications and functionalities to associate with each of the home screens of the device. FIG. 7 illustrates an example process 700 for enabling a user of an electronic device to configure multiple home screens of the device. In some embodiments, the user may create different home screens for different settings/profiles and select applications and functionalities for association with each of the home screens such that, when a particular home screen is triggered, the desired application icons are displayed to the user and the desired functionalities are activated on the device.

The process 700 begins by providing (at 702) several customizable environments, each of the customizable environments associated with a home screen that is capable of being displayed on an electronic device. As mentioned above, a customizable environment may be a virtual environment within the operating system of the device. The user may configure each customizable environment to include a number of applications and functionalities. In some embodiments, the device associates a customizable environment with a home screen. Some embodiments associate a customizable environment with one or more screens in addition to the home screen. The device may then display elements (e.g., icons representing applications and functionalities in the customizable environment) on the home screen or on the one or more additional screens that are included within the same environment.

The process 700 then enables (at 704) the user of the device to select a set of applications and functionalities for each of the customizable environments. In some embodiments, the device enables the user to select a set of applications from a displayed list of applications (e.g., by individually selecting applications on the device through a browse function). The user may select applications that may be useful to the user when the user is in a particular setting, so that when a particular profile/setting is triggered, the device of some embodiments displays the relevant and useful applications to the user on a home screen associated with the environment. The user may then have access to these relevant applications while the particular setting/profile is triggered (e.g., upon a cue, by user input).

Further, some embodiments enable the user to designate a particular setting for a selected application such that triggering a particular setting not only gives the user access to the associated application but also the application in a particular mode. For example, the user may configure the camera application in a hiking home screen differently from the camera application in a food home screen. Specifically, the user may configure the camera application in the hiking home screen to use lens for capturing high resolution images whereas the user may configure the camera application in the food home screen to a macro setting that uses macro lens.

In some embodiments, the device enables the user to select a set of functionalities on the device from a list of functionalities (e.g., by selecting from a checklist of functionalities using a cursor). Similarly, the user may select certain functionalities that may be applicable or useful to the user in a particular setting (e.g., low battery mode while the user is sleeping), such that, when the particular profile/setting is triggered, the device automatically activates the selected functionalities on the device. Some embodiments automatically activate the selected functionalities when a particular setting/profile is triggered while in some embodiments, some of the selected functionalities are available to the user to be activated at anytime that the user is in the particular setting/profile.

Then, the process 700 associates (at 706) the set of applications and functionalities to the particular customizable environment such that, when the associated home screen is triggered, information for the set of applications is displayed on the associated home screen and the set of functionalities is activated on the device. As described above, the associated home screen may be triggered by a user selecting the home screen (e.g., by a finger swipe), by an external cue (e.g., a phone call), by satisfying a predetermined condition (e.g., when the user is at a certain location). When the home screen is triggered, the device of some embodiments determines the environment with which the home screen is associated. The device of some embodiments then determines the applications and functionalities associated with the environment and displays information for the set of applications (e.g., using application icons) and activates these functionalities on the home screen.

Figure 8:
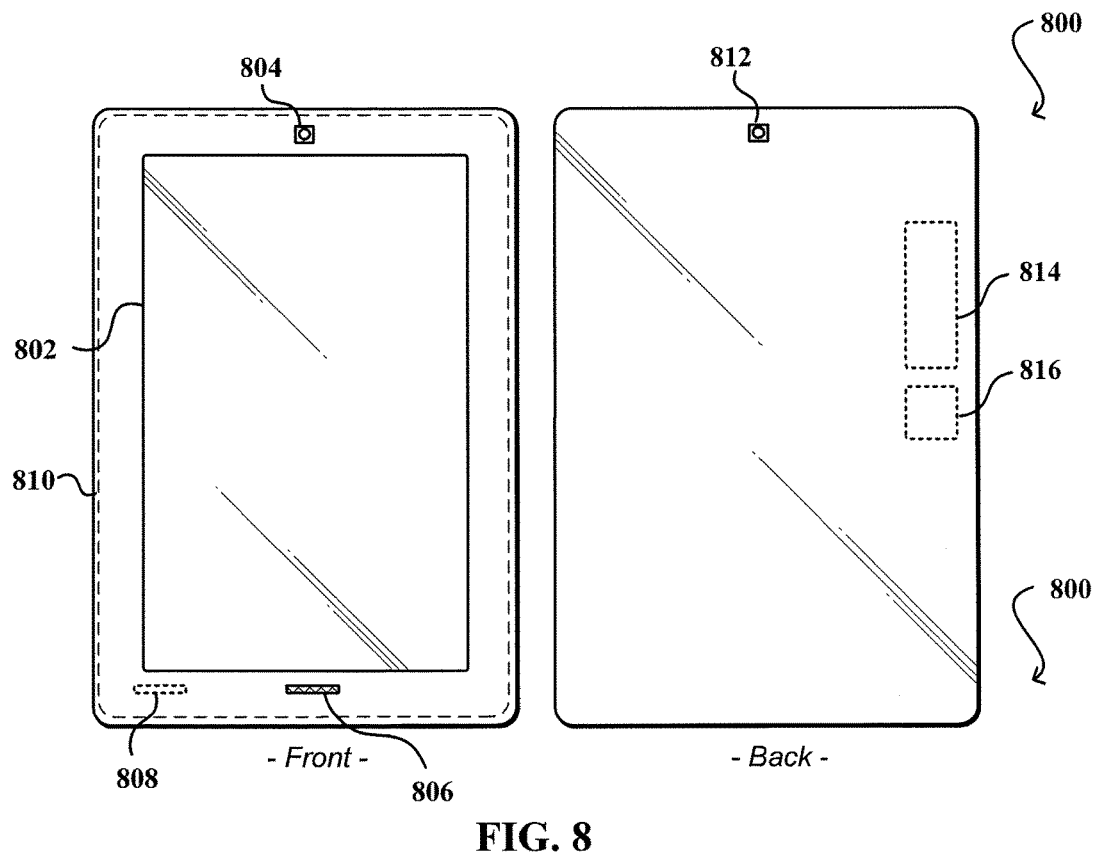
FIG. 8 illustrates front and back views of an example electronic device that can be used in accordance with various embodiments.

FIG. 8 illustrates front and back views of an example electronic device 800 that can be used in accordance with various embodiments. Although one type of electronic device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the electronic device 800 has a display screen 802 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 810 on other areas of the device as well, such as on the sides or back of the device. While in at least some embodiments a user can provide input by touching or squeezing such a material, in other embodiments the material can be used to detect motion of the device through movement of a patterned surface with respect to the material.

The example electronic device can include one or more image capture elements for purposes such as conventional image and/or video capture. As discussed elsewhere herein, the image capture elements can also be used for purposes such as to determine motion and receive gesture input. While the electronic device in this example includes one image capture element 804 on the "front" of the device and one image capture element 812 on the "back" of the device, it should be understood that image capture elements could also, or alternatively, be placed on the sides or corners of the device, and that there can be any appropriate number of capture elements of similar or different types. Each image capture element may be, for example, a camera, a chargecoupled device (CCD), a motion detection sensor, or an infrared sensor, or can utilize another image capturing technology.

The electronic device can also include at least one microphone 806 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 800 in this example also includes at least one motion- or position-determining element 808 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
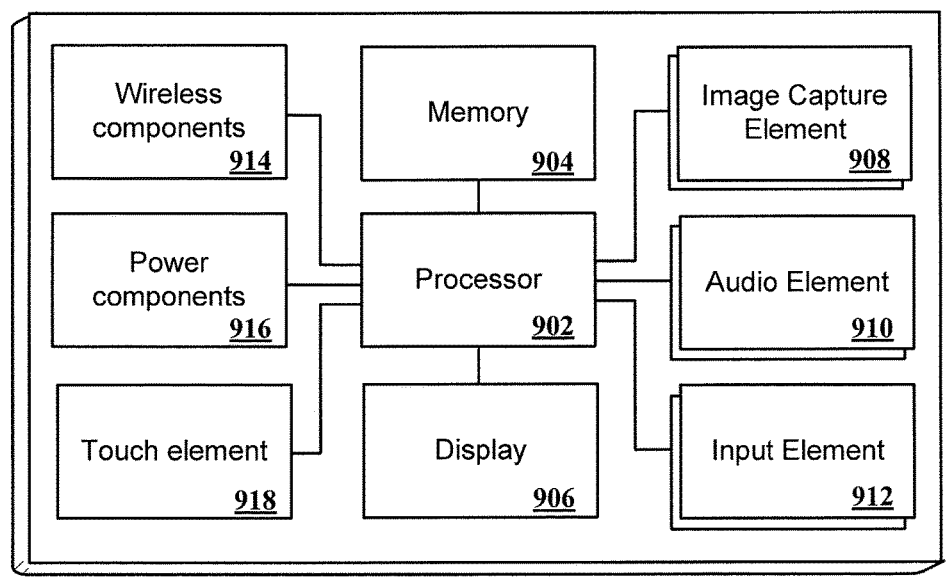
FIG. 9 illustrates example components of an electronic device that can be used in accordance with various embodiments.

In order to provide functionality such as that described with respect to FIG. 8, FIG. 9 illustrates an example set of basic components of an electronic device 900, such as the device 800 described with respect to FIG. 8. In this example, the device includes at least one processor 902 for executing instructions that can be stored in at least one memory device or element 904. As would be apparent to one of ordinary skill in the art, the device can include many types of memory, data storage or computer-readable storage media, such as a first data storage for program instructions for execution by the processor 902, the same or separate storage can be used for images or data, a removable storage memory can be available for sharing information with other devices, etc.

The device typically will include some type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device in many embodiments will include at least one audio element 910, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device.

The device can include at least one additional input device 912 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 916 known in the art for providing power to an electronic device, which can include capacitive charging elements for use with a power pad or similar device as discussed elsewhere herein. The example device also can include at least one touch- and/or pressure-sensitive element 918, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

Figure 10:
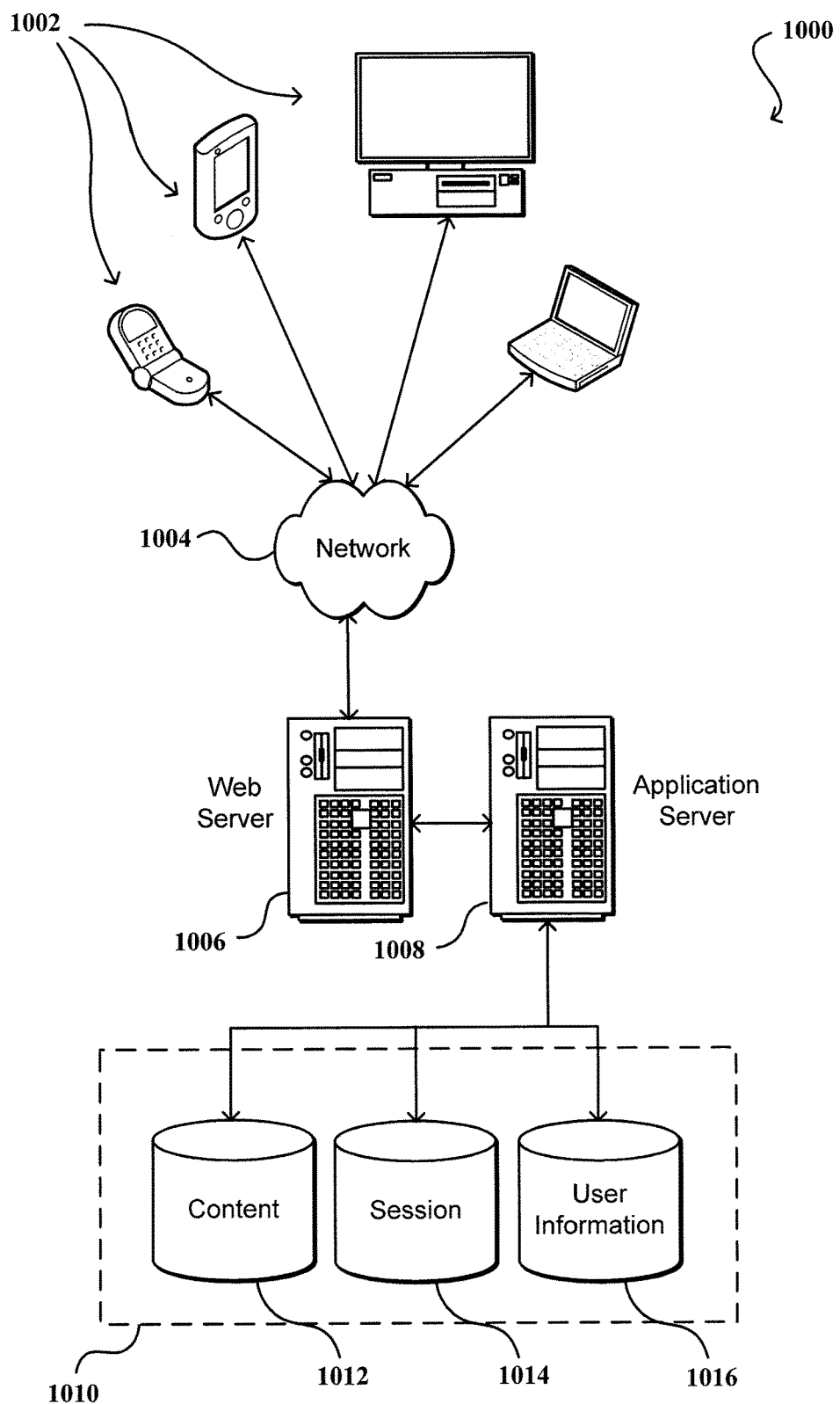
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing an appropriate selection of functionalities and application elements on an electronic device, comprising:
   receiving a first selection of a first home screen from a plurality of home screens on the electronic device, the first home screen being associated with a first set of functionalities of the electronic device and a first set of applications including at least a first application;
   determining, by the electronic device, a first processing rate for the first application, the determining the first processing rate based at least in part on the first selection of the first home screen;
   activating the first set of functionalities;
   displaying at least a portion of the first set of applications;
   associated with activating the first set of functionalities, executing the first application at the first processing rate;
   receiving a second selection of a second home screen of the plurality of home screens on the electronic device, the second home screen being associated with a second set of functionalities of the electronic device and a second set of applications including at least the first application;
   determining, by the electronic device, a second processing rate for the first application, the determining the second processing rate based at least in part on the second selection of the second home screen, the second processing rate greater than the first processing rate;
   activating the second set of functionalities;
   displaying at least a portion of the second set of applications; and
   associated with activating the second set of functionalities, executing the first application at the second processing rate.

2. The method of claim 1, wherein a user of the electronic device is able to specify at least a portion of a set of applications and a set of functionalities for a corresponding home screen.

3. The method of claim 1, wherein the first home screen is customized for a work profile and the second home screen is customized for a personal profile.

4. A method of providing a plurality of customized environments to a user of an electronic device, the method comprising:
   receiving a first selection of a first digital environment of a plurality of digital environments on an electronic device, the first digital environment being associated with one or more first functional states and one or more first applications including at least a first application;
   determining, by the electronic device, a first processing rate for the first application, the determining the first processing rate based at least in part on the first selection of the first digital environment;
   activating the one or more first functional states;
   displaying at least a portion of the one or more first applications;
   associated with activating the one or more first functional states, executing the first application at the first processing rate;
   receiving a second selection of a second digital environment of the plurality of digital environments, the second digital environment being associated with one or more second functional states and one or more second applications including at least the first application;
   determining, by the electronic device, a second processing rate for the first application, the determining the second processing rate based at least in part on the second selection of the second digital environment;

activating the one or more second functional states;

displaying at least a portion of the one or more second applications; and associated with activating the one or more second functional states, executing the first application at the second processing rate.

5. The method of claim 4, further comprising:

deactivating at least one functional state of the one or more first functional states not corresponding to the one or more second functional states.

6. The method of claim 4, wherein at least two of the plurality of digital environments are associated with at least one overlapping functional state.

7. The method of claim 4, further comprising:

receiving a request to activate at least one functional state, of the one or more first functional states or the one or more second functional states, within at least one application; and activating the at least one functional state.

8. The method of claim 4, wherein the plurality of digital environments includes a meeting home screen, the meeting home screen associated with at least one of a silent mode, an audio/video recording application, a note taking application, a calendar application, a corporate contacts application, a work email application, a Wi-Fi mode, or a low distraction interface.

9. The method of claim 4, wherein the plurality of digital environments comprises a work home screen, the work home screen associated with at least one of a vibrate function, a note taking application, a work email application, a corporate contacts application, a Wi-Fi function, a de-stress function, or a quick-dim function for a screen of the electronic device.

10. The method of claim 4, wherein the plurality of digital environments comprises a commute home screen, the commute home screen associated with at least one of a Bluetooth function, a Wi-Fi function, a traffic notification application, a navigator application, a loudspeaker application, a parking application, or an audio books application.

11. The method of claim 4, wherein the plurality of digital environments comprises a workout home screen, the workout home screen associated with at least one of an accelerometer function, a pedometer function, an image capturing function, a music application, a video application, a vibrant ringtone function, a traffic function, a navigator application, a loudspeaker application, a weather application, or an audio books application.

12. The method of claim 4, wherein at least one of the plurality of digital environments is preconfigured by a third party assembling functional states and applications relating to a particular topic.

13. The method of claim 12, wherein the particular topic is at least one of a sports interest, a music interest, a drama interest, or an entertainment interest, wherein a digital environment for the particular topic is obtained from the third party.

14. The method of claim 4, further comprising:

navigating to a digital environment of the plurality of digital environments based on satisfaction of a predetermined condition.

15. The method of claim 14, further comprising:

receiving an external cue causing the electronic device to navigate to the digital environment.

16. A non-transitory computer readable storage medium storing instructions that, upon being executed by at least one processor of an electronic device, cause the electronic device to:

detect a first trigger for activating a first home screen of a plurality of home screens on the electronic device, the first home screen being associated with a first set of functionalities of the electronic device and a first set of applications including at least a first application;

determine, by the electronic device, a first processing rate for the first application, the determine the first processing rate based at least in part on the first trigger for activating the first home screen;

display at least a portion of the first set of applications;

activate the first set of functionalities;

associated with activate the first set of functionalities, execute the first application at the first processing rate;

detect a second trigger for activating a second home screen of the plurality of home screens on the electronic device, the second home screen being associated with a second set of functionalities and a second set of applications including at least the first application;

determine, by the electronic device, a second processing rate for the first application, the determine the second processing rate based at least in part on the second trigger for activating the second home screen;

display at least a portion of the second set of applications;

activate the second set of functionalities; and associated with activate the second set of functionalities, execute the first application at the second processing rate.

17. The non-transitory computer readable storage medium of claim 16, wherein at least two of the plurality of home screens are associated with at least one overlapping functionality.

18. The non-transitory computer readable storage medium of claim 16, wherein the instructions further cause the electronic device to:

deactivate at least one functionality of the first set of functionalities not corresponding to the second set of functionalities.

19. The non-transitory computer readable storage medium of claim 16, wherein at least one of the first trigger or the second trigger is based on one of an external cue, a user input, or satisfaction of a predetermined condition.

20. The non-transitory computer readable storage medium of claim 19, wherein the satisfaction of the predetermined condition includes at least one of exceeding a predetermined time or being at a predetermined location.

* * * * *